J. M. Elliott,
Cotton Planter.

No. 92,804.   Patented July 20, 1869.

Witnesses.
Geo. W. Mabee
Jno. K. Brooks

Inventor.
J. M. Elliot.
per [signature]
Attorneys.

United States Patent Office.

J. M. ELLIOTT, OF WINNSBOROUGH, SOUTH CAROLINA.

Letters Patent No. 92,804, dated July 20, 1869.

IMPROVEMENT IN COTTON-SEED PLANTERS.

The Schedule referred to in these Letters Patent and making part of the same.

*To all whom it may concern:*

Be it known that I, J. M. ELLIOTT, of Winnsborough, in the district of Fairfield, and State of South Carolina, have invented a new and improved Cotton-Seed Planter; and I do hereby declare that the following is a full, clear, and exact description thereof, which will enable others skilled in the art to make and use the same, reference being had to the accompanying drawings, forming part of this specification.

This invention relates to improvements in cotton-seed planters, designed to improve the efficiency of the same.

The invention consists of a peculiar arrangement, in a one-wheel planter, of an adjustable plow relatively to the wheel, so as to be gauged by it.

Also, of an improved arrangement of pin-wheel and fixed pins in a hopper, surrounding in part the axle of the supporting-wheel.

Also, of certain other details of arrangement, as will be hereinafter more fully specified.

Similar letters of reference indicate corresponding parts.

A represents the supporting-wheel, and B the frame thereof, the front of which is provided with a bent hitching-rod, c, and from the rear, two handles D project. These parts are arranged similar to the common way.

Figure 1:
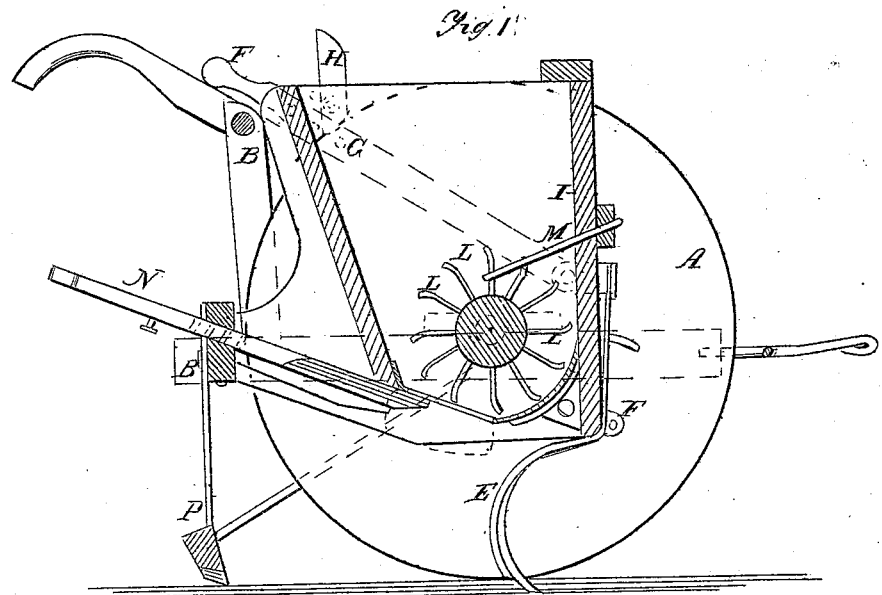
Figure 1 represents a longitudinal sectional elevation of my improved planter taken on the line $x$ $x$ of fig. 2.
Figure 2:
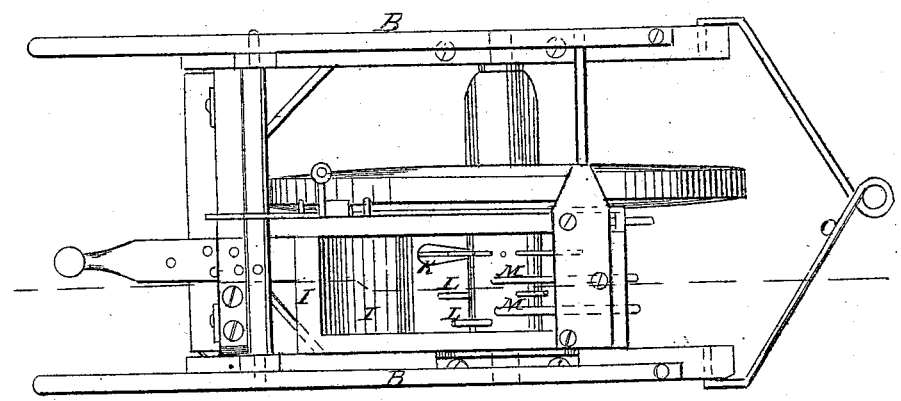
Figure 2 represents a plan view of the same.

E represents a bent plow or scraper, bent around the front part of the hopper, and suspended thereat on a pivot, terminating, beyond the said pivot, in a jointed connection with an adjusting-slide, F, placed alongside of the hopper, and provided with a series of holes to spring over pins G, shown dotted in fig. 1. The button H is provided, to prevent the said sliding bar F from disengaging with the pins.

By this means of adjustment, the plow may be presented to the ground or held above it, for moving over ground not to be plowed.

The arrangement of the plow, whereby it engages the ground at or about the vertical line of the wheel, is intended for gauging the said plow by the wheel, so that it will always cut a uniform depth.

The hopper I is placed over the shaft, at one side of the wheel, and provided with a cut-out passage, K, at the bottom, for the discharge of the seed. The said passage is wider at the rear than at the front end.

A set of discharging-fingers, L, is placed on the shaft of the wheel, and arranged to work into the said passage, to discharge the seed without clogging. They are bent at the ends to the rearward of the direction of their movement, so as to prevent the cotton fibre from clogging upon them. These fingers work between a set of fixed fingers, M, arranged in front of the axle, and slightly above it. These latter fingers are designed to prevent the arms from packing the seed too much on the side of the shaft, when the movement of the fingers is downward.

The shape of the discharging-orifice prevents any wedging or breaking of grains, which might occur, if as wide at the point where the seeds are pressed down as in the rear, for from the first contact with the walls of the slot, as long as the fingers have a tendency to press the seed through, the said slots widen and allow the seed freedom to pass.

A slide, N, is provided, to open and close the said passage, as required, to vary the amount of seed delivered.

A scraper, P, follows behind, in the usual way, to close the furrow over the seed.

This machine is also useful for distributing guano and other fertilizers.

Having thus described my invention,

I claim as new, and desire to secure by Letters Patent—

1. The arrangement of the plow E relatively to the wheel A, and for adjustment by means of the slide F, substantially as specified.

2. The arrangement in the hopper, having the passage K, shaped as described, of the bent rotating fingers L, and fixed fingers, all substantially as specified.

J. M. ELLIOTT.

Witnesses:
J. OBEAR,
W. S. RABB.